United States Patent [19]

Squires

[11] 3,982,326
[45] Sept. 28, 1976

[54] COUNTERCURRENT CONTACTING OF GAS AND GRANULAR MATERIAL IN PANEL BED

[76] Inventor: Arthur M. Squires, 245 W. 104 St., New York, N.Y. 10025

[22] Filed: Aug. 28, 1974

[21] Appl. No.: 501,277

[52] U.S. Cl. .................................... 34/22; 34/174; 55/96; 55/302; 55/479
[51] Int. Cl.² .......................... F26B 3/00; F26B 5/00
[58] Field of Search ................ 34/22, 26, 174, 168; 55/96, 98, 302, 474, 479, 512–519

[56] References Cited
UNITED STATES PATENTS

| | | | |
|---|---|---|---|
| 2,601,102 | 6/1952 | Dickey | 165/107 |
| 3,296,775 | 1/1967 | Squires | 55/96 |
| 3,800,508 | 4/1974 | Zenz | 55/479 |

FOREIGN PATENTS OR APPLICATIONS

| | | | |
|---|---|---|---|
| 216,675 | 6/1924 | United Kingdom | 55/474 |

*Primary Examiner*—Bernard Nozick
*Attorney, Agent, or Firm*—Abraham A. Saffitz

[57] ABSTRACT

There is provided an improved panel bed of granular material useful for chemically or physically treating a gas and a granular material in a countercurrent contact. The contacting equipment is unusually compact and affords an unusually low pressure drop in the gas. Free surfaces of the granular material for entry of gas are supported cooperatively by "louvers" each having a gently curved upper surface, the outer edge of which supports the outer edge of a given free surface. The gently curved upper surface of the louver inclines from its outer edge first downward and toward the granular material bed and then upward toward an inner edge relatively deep within the granular material bed. The inner edge of a supporting surface is either above the inner edge of the superjacent free surface of granular material or, if below, a line drawn through these edges is inclined at an angle of less than about 45° to the horizontal. A zone for countercurrent contacting of gas and the granular material is formed between each adjacent pair of supporting louvers. "Cleaning" is by puffback to remove granular material "spent" by the treatment, together with accumulated dust if the treatment includes gas filtration.

21 Claims, 25 Drawing Figures

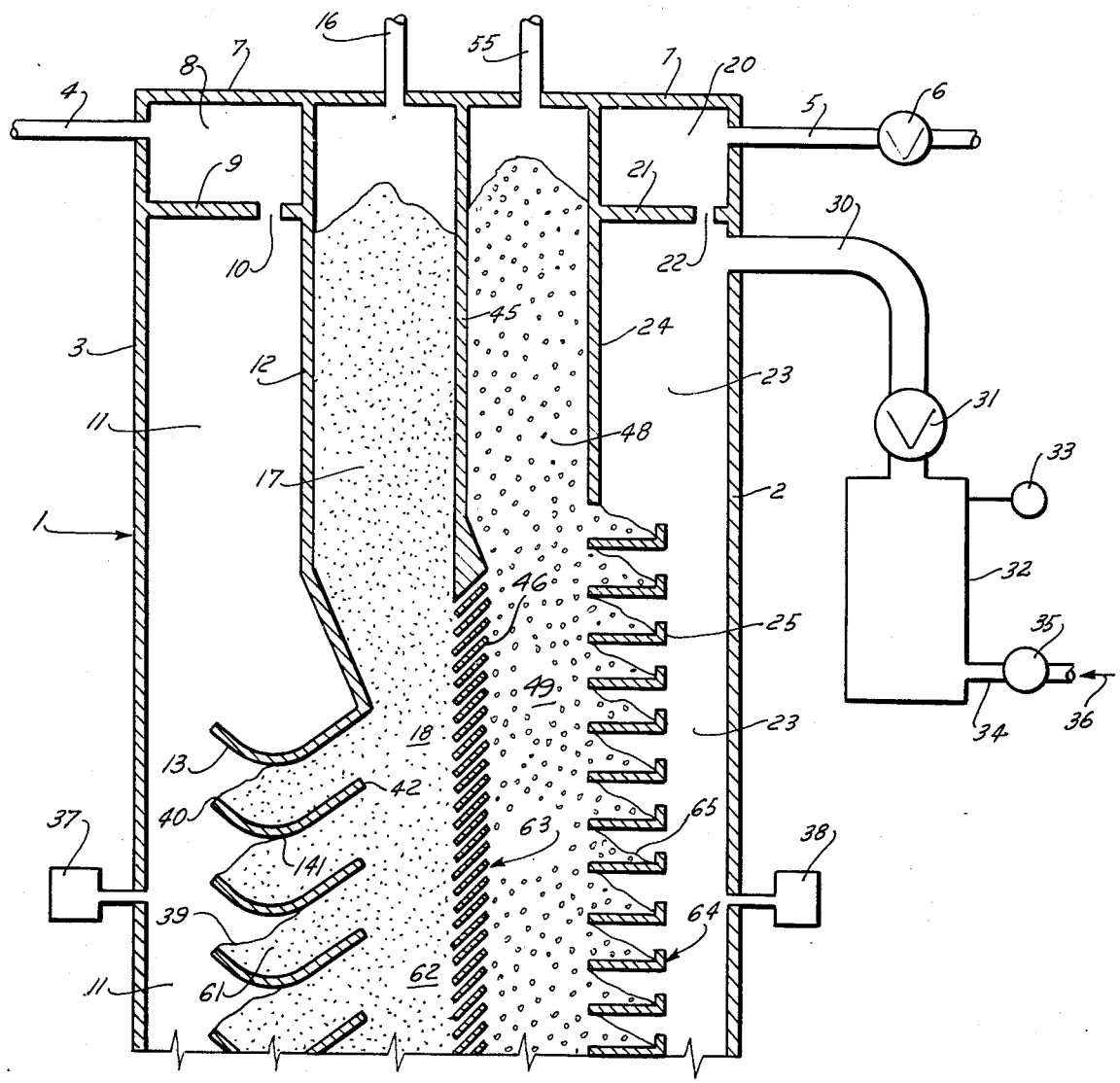
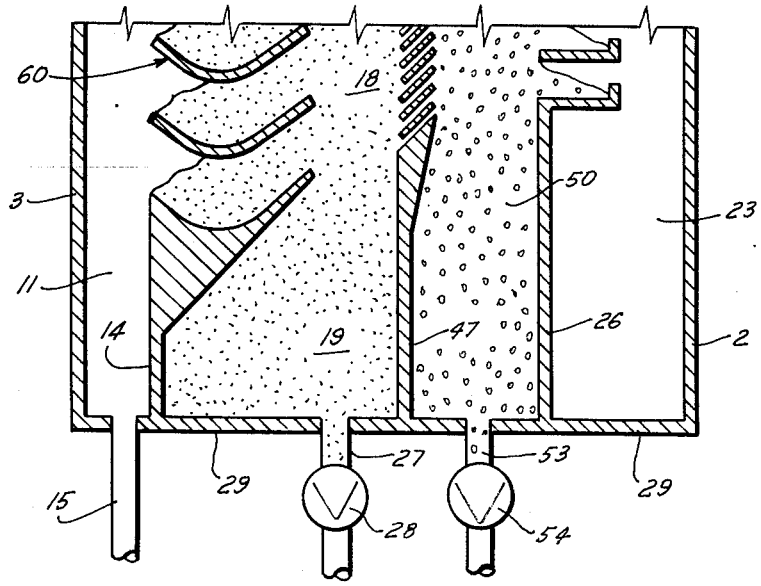
FIG. 1

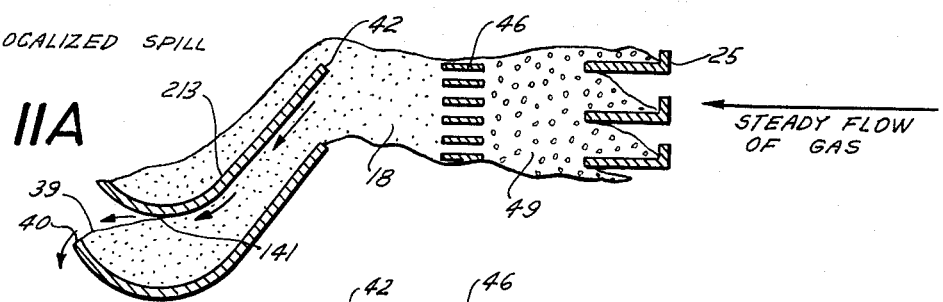
FIG. IIA STEADY LOCALIZED SPILL
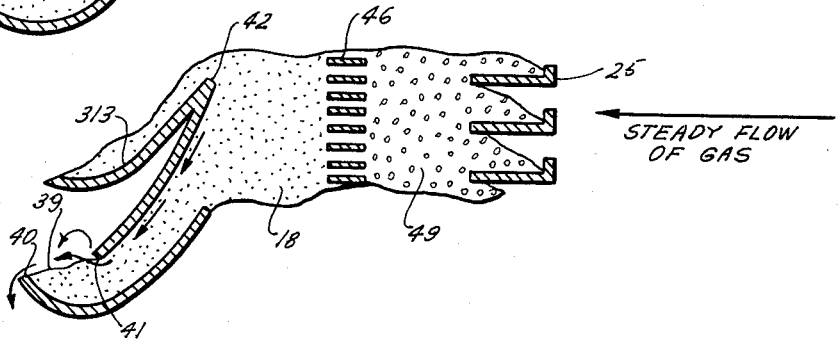
FIG. IIB
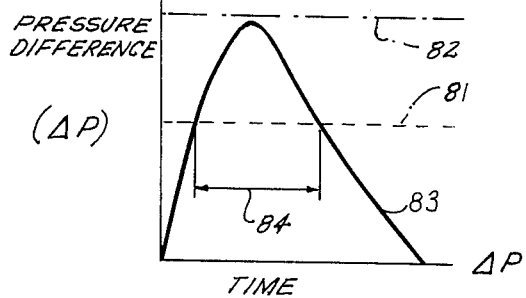
FIG. 12A
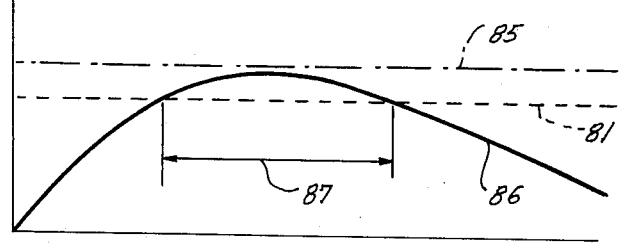
FIG. 12B
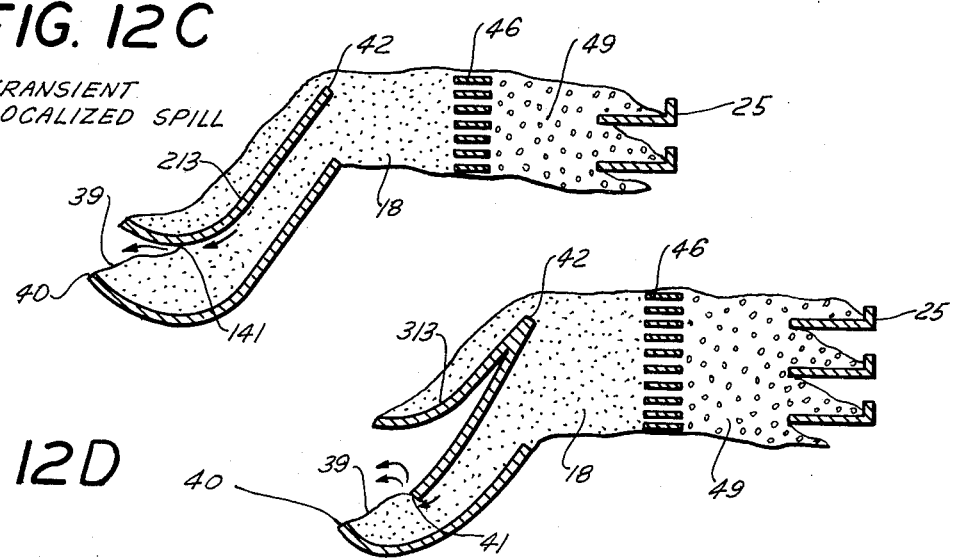
FIG. 12C TRANSIENT LOCALIZED SPILL
FIG. 12D

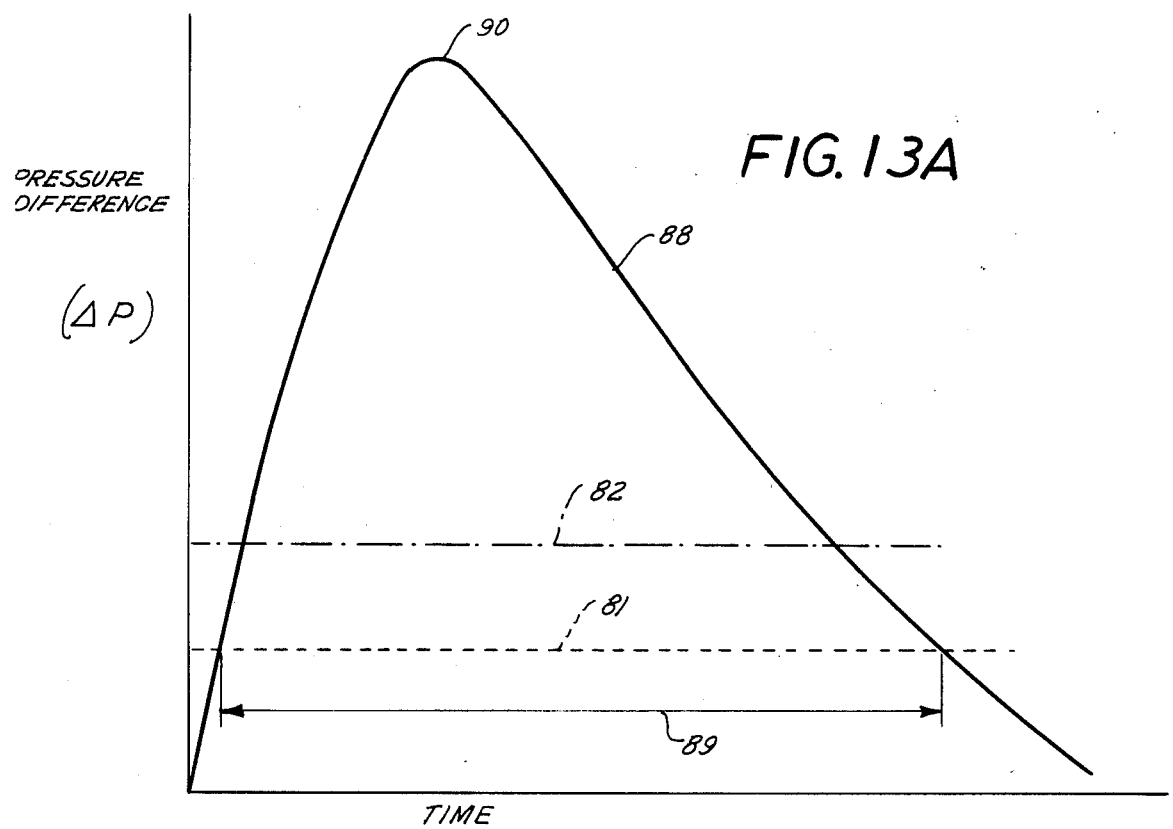
FIG. 13A
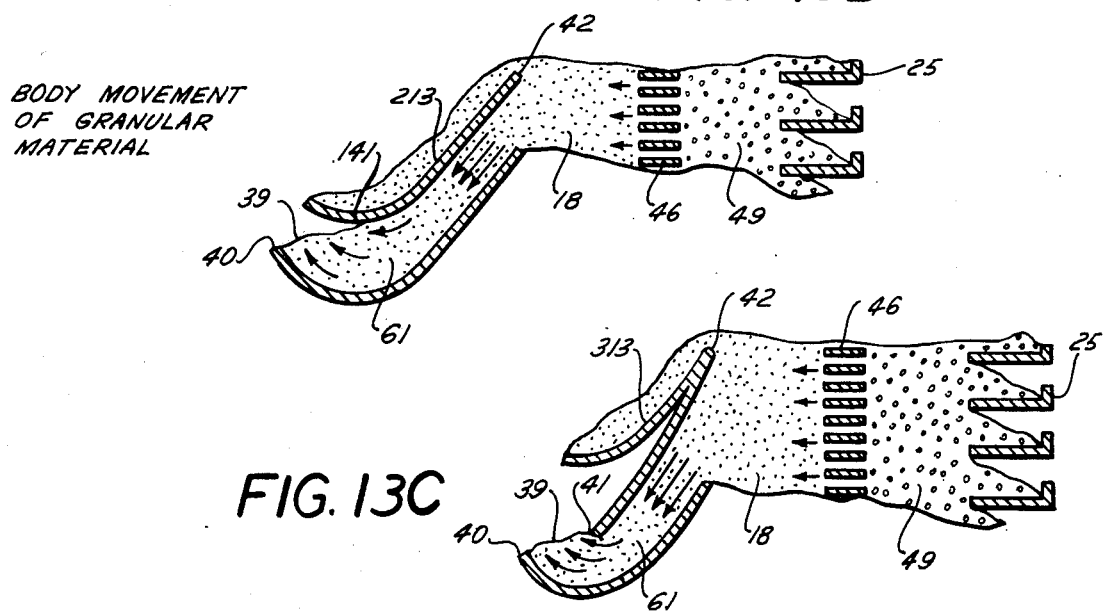
FIG. 13B
FIG. 13C

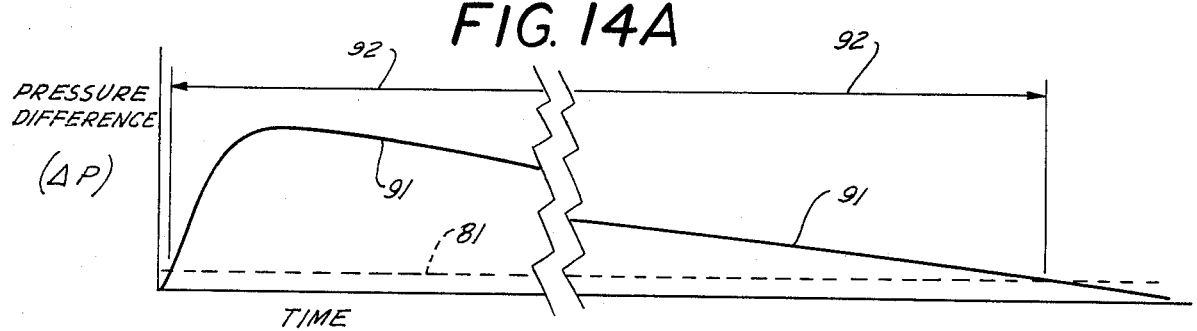
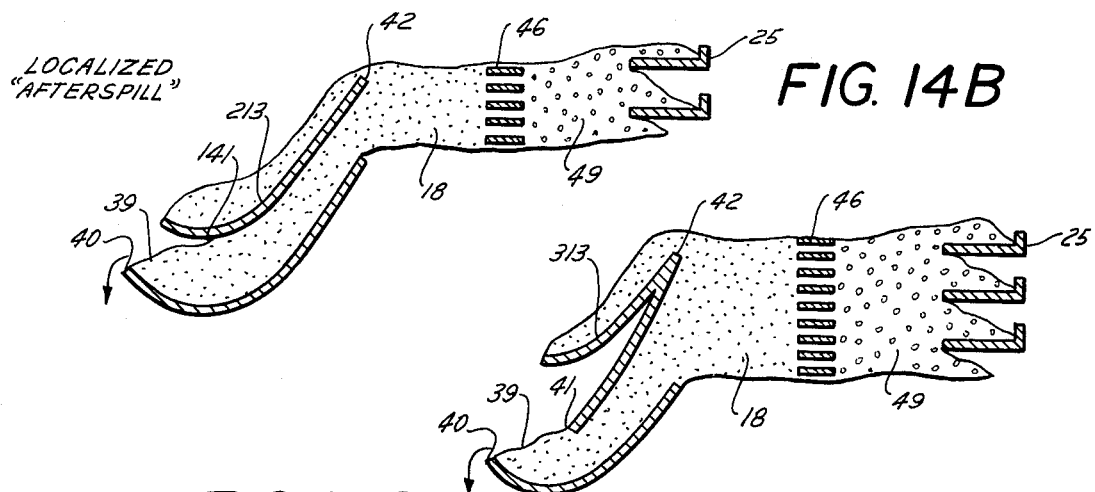
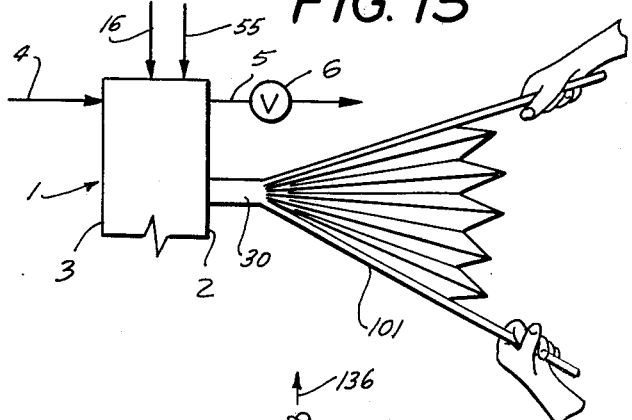
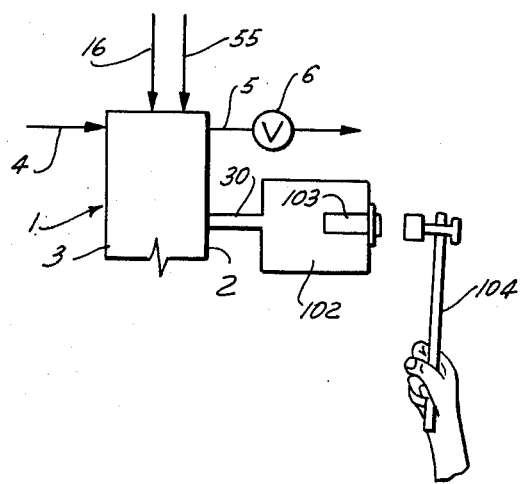
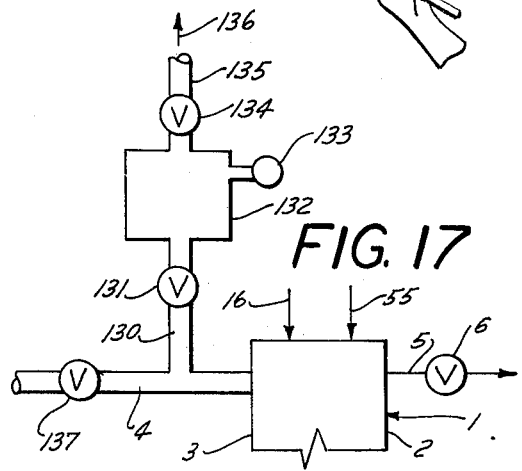

COUNTERCURRENT CONTACTING OF GAS AND GRANULAR MATERIAL IN PANEL BED

CROSS-REFERENCE TO RELATED APPLICATIONS

This application is related to my co-pending applications, filed simultaneously herewith, numbered and entitled as follows:
1. Treating Gas and Granular Material in Panel Bed, Ser. No. 501,276
2. Filtering Dusty Gas in Panel Bed, Ser. No. 501,278
3. Treating Gas and Fine Granular Material in Panel Bed, Ser. No. 501,275

The instant application is the third of this sequence.

FIELD OF THE INVENTION

This invention relates to the intimate contacting of a gas and a granular solid material in the countercurrent manner for the purpose of chemically or physically treating one or both of these substances, for example, to filter a dust from a gas or to effect a chemical change in gas or solid or to remove a chemical constituent of the gas by absorption or adsorption or to heat a cold gas by contact with a hot solid. Specifically, contact is improved by a new design of panel bed suitable for cleaning by a puffback to remove spent solid.

DESCRIPTION OF THE PRIOR ART

My aforementioned co-pending application number 1, "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

U.S. Pat. No. 2,488,493 (Nov. 15, 1949) disclosed an arrangement for contacting a gas and a solid in zones retained between adjacent pairs of steeply inclined louvers mounted vertically in a panel resembling a venetian blind. The louvers inclined downwardly and outwardly from a central feed pipe arrangement that supplied fresh contact solid to each of the zones, and used-up solid was withdrawn downward from each of the zones via a common vertical passageway leading to a bin bottom from which the used-up solid was withdrawn via a pipe.

My earlier U.S. Pat. No. 3,296,775 (Jan. 10, 1967) taught that a reverse surge flow of gas across a panel bed can produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which as steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas to produce a movement of granular material in mass (a "body movement") toward the gas entry faces of a panel bed.

The arrangement of the aforementioned U.S. Pat. No. 2,488,493 did not lend itself to combination with use of a reverse transient flow of gas to remove contact solid from gas entry surfaces. In *Chemical Engineering* for Nov. 20, 1967, on pages 133–140, I proposed a panel bed gas-solid contactor that I hoped would be suitable for cleaning by the reverse transient gas flow technique. Treating zones of the contact solid were to be held between louvers inclining steeply downwardly and outwardly from a column of solid supply, the solid being retained at the lower elevations of the treating zones by four horizontal solid-retaining "aprons" per single inclined louver. To my disappointment, trials of the arrangement led to poor results: poor distribution of the quantity of spilled solid from the several treating zones, whereas good performance requires relatively uniform distribution of the spill, and regions of static solid in the vicinity and upon some of the solid-retaining aprons.

GENERAL DESCRIPTION OF THE INVENTION

As a result of diligent experimentation upon a number of designs for panel beds (generally discussed in several of the aforementioned co-pending applications), I have only recently come to an understanding that the body movement created by a reverse transient flow of gas is greatly impeded if the granular material is required to negotiate sharp corners of if there are "pockets" where the material is apt to remain static and in relationship to which material the bodily moving material must move in shear. As a result of this understanding, I am able now to specify improved designs for panel beds to provide countercurrent gas-solid treating zones with uniform motion of the solid through the zones upon the application of successive cleanings by a reverse transient flow of gas.

OBJECTS OF THE INVENTION

An object of the invention is to provide an improved method and apparatus for the chemical and physical treatment of at least one of a gas and a granular medium brought into contact.

Another object is to provide an improved method and apparatus for bringing a gas and a granular solid into intimate countercurrent contact.

Another object is to provide a filter for dusty gas.

Another object is to provide a filter or solid contactor for gas at elevated temperature.

SUMMARY OF THE METHOD FEATURES OF THE INVENTION

My invention relates to an improved method of countercurrently contacting gas and granular material with each other to effect physical or chemical treatment of at least one of them. Granular material is arranged in a bed having a plurality of transversely disposed, upwardly spaced, gas entry portions separated by interposed supporting members having outer and inner edges. The gas entry portions have gas entry faces having outer edges that are substantially contiguous with the outer edges of the supporting members. A typical supporting member is gently curved and inclines downwardly and inwardly from its outer edge and then upwardly and inwardly toward its inner edge. The inner edge of a typical supporting member is either above the inner edge of the superjacent free surface of granular material, borne by the afotermentioned typical member, or, if below, a line drawn through these edges is inclined at an angle of less than about 45° to the horizontal. The bed has gas exit portions spaced horizontally apart from the inner edges of the supporting members. Gas is caused to flow forwardly in a substantially continuing flow during the aforementioned treatment through the gas entry portions of the granular material bed and outwardly from the gas exit portions to effect treatment of gas or granular material or both. Thereafter, a transient flow of gas is caused to move in the direction in reverse to the aforementioned flow of gas. The transient reverse flow produces first a rise (at a given rate of rise) and subsequently a fall in the pressure difference between the gas exit portions and the gas entry portions. This difference should remain greater than a first critical minimum difference for a time interval of less than about 150 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed. The second critical minimum difference depends upon the rate of rise in the pressure difference, being larger the more rapid the rise. The aforementioned time interval is sometimes advantageously less than about 50 milliseconds, especially for use of the invention to filter dust from a gas.

A typical supporting member sometimes advantageously has both an upper and a lower surface each having outer and inner edges wherein the surfaces articulate at an edge joint at their respective inner edges. The outer edge of a typical gas entry face is substantially contiguous with the outer edge of the upper surface of the typical supporting member, and the inner edge of the typical gas entry face is substantially contiguous with the outer edge of the lower surface of the typical member.

For convenience of reference, I sometimes use the term "reverse puff" or "puffback" for the specified reverse transient flow of gas. The term puffback denotes broadly my new cleaning technique, explicated more fully in my aforementioned co-pending application number 1, whereby a panel bed is rid of solid spent by a gas-solid contacting procedure, together with dust captured by filtration along with some of the spent solid, if the panel bed has been employed as a gas filter.

SUMMARY OF THE APPARATUS FEATURES OF THE INVENTION

My invention also relates to an improved gas-solid contactor with a pair of upwardly extending, horizontally spaced-apart, perforate retaining walls, with means for supplying a loose solid particulate material into the space between the walls. There is a plurality of particulate-material support members each adjacent a perforation of the first perforate wall, each typical support member being arranged to extend outwardly and downwardly in a gentle curve from below its adjacent perforation and then to extend further in a gentle curve upwardly and into an inlet compartment in communication with the perforations of the first wall. The support members are arranged cooperatively to support the particulate material and retain the material within the space between the perforate walls, and they are arranged to support and expose to the inlet compartment a plurality of free surfaces of particulate material. The inner edge of a typical support member is either above the inner edge of the free surface supported by the member or, if below, a line drawn through these edges is inclined at an angle of less than about 45° to the horizontal. A gas outlet compartment is in communication with the perforations of the second perforate wall. There is an inlet for admitting gas into the inlet compartment, and an outlet for removing gas from the outlet compartment. Means are provided for periodically effecting a body movement of the particulate material toward the inlet cmpartment of at least those portions of the particulate material including the free surfaces and which are retained on the support member. The body movement means comprises means for effecting a transient flow of gas from gas outlet compartment to gas inlet compartment that produces first a rise and subsequently a fall in the pressure difference between the gas outlet compartment and the gas inlet compartment, the pressure difference remaining greater than the aforementioned first critical minimum difference for less than about 150 milliseconds and also peaking beyond the aforementioned second critical minimum difference.

A typical support member sometimes advantageously has both an upper and a lower surface each having outer and inner edges wherein the surfaces articulate at an edge joint at their respective inner edges, as hereinbefore described and further to be elucidated hereinafter.

A preferred means for effecting the transient flow of gas is a source of gas under pressure and means for effecting a sudden discharge of gas from the pressure source into the outlet compartment, with volume control means for limiting the quantity of gas discharged.

Another preferred means, especially useful for a small installation in infrequent service, is a bellows fitted to discharge gas into the outlet compartment. Also suitable is a chamber connected to the outlet compartment and fitted with a blank cartridge mounted to discharge gas explosively into the chamber. For operation of the contactor at an elevated pressure, it will sometimes be preferable to provide a chamber at lower pressure that can be placed quickly into communication with the inlet compartment.

BRIEF DESCRIPTION OF THE DRAWINGS

FIG. 1 is a vertical section view of a preferred panel bed gas-solid contactor, with a bed of contacting solid;

FIGS. 11A and 11B illustrate the steady localized spill produced by a steady backflow of gas across the panel bed;

FIGS. 12C and 12D illustrate the transient localized spill caused by a transient reverse flow of gas that produces a rise and fall in pressure difference as typified by the curves seen in FIGS. 12A and 12B;

FIGS. 13B and 13C illustrate the desired body movement of granular material, effected by puffback, i.e., a transient reverse flow of gas that produces the specified rise and fall in pressure difference, as typified by the curve seen in FIG. 13A;

FIGS. 14B and 14C show the undesirable localized "afterspill" that ensues when a transient reverse flow of gas produces a rise and fall in pressure difference such as that seen in FIG. 14A; and FIGS. 15, 16, and 17 show alternative arrangements for effecting puffback.

DESCRIPTION OF THE PREFERRED EMBODIMENTS

Figure 2:
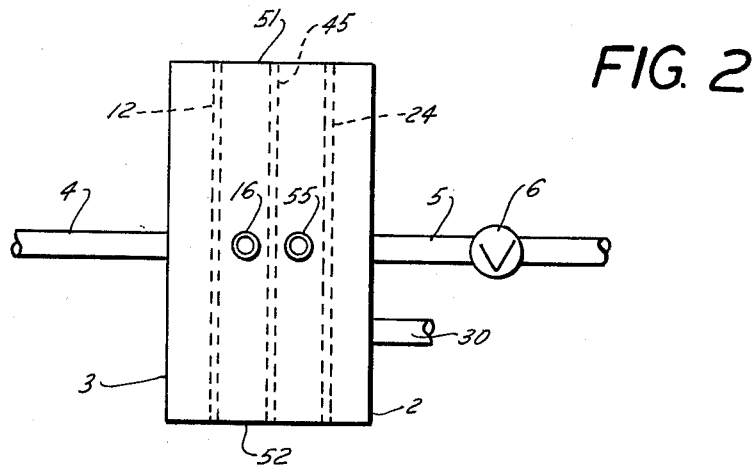
FIG. 2 is a top view of the panel of FIG. 1.

In the several figures, like reference numerals refer to like parts having like functions. In FIG. 1 the panel bed gas-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular contact solid 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular solid, by means of pipe 27 and valve 28. Perforate wall 63 comprises a series of inclined louvers or slats 46 mounted one above another in a structure resembling a venetian blind and narrowly spaced apart in the vertical direction. Horizontally spaced-apart from wall 63 is perforate wall 64 comprising a series of generally horizontal louvers or slats 25 also mounted one above another. Granular material bed 49, comprising material considerably coarser in size than the granular contact solid of bed 18, and also preferably denser than the contact solid, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be treated is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) and via plenum space 20 and pipe 5. Louvers 25 cooperate to support gas exit surfaces 65 of bed 49.

Figure 5:
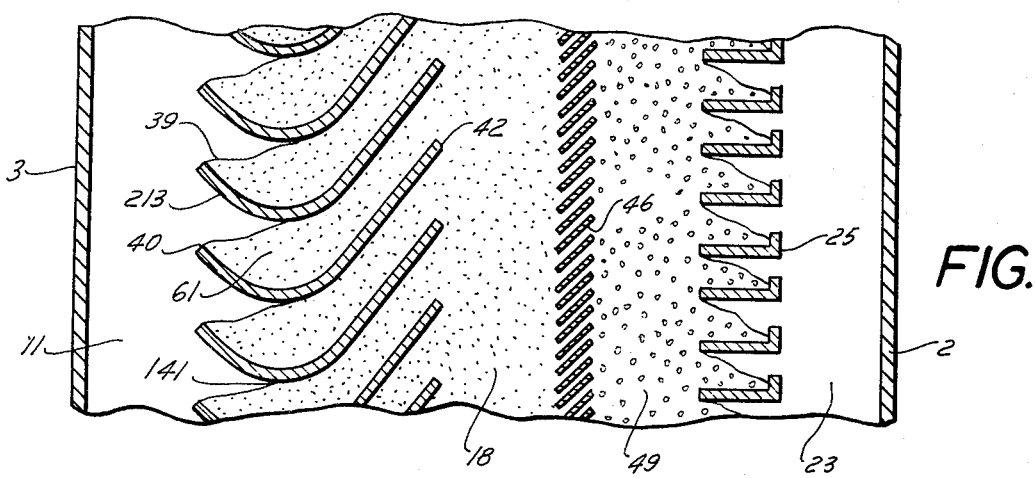
FIGS. 5 through 9 show alternative support members for the panel bed's gas entry face.

Perforate wall 60 comprises a series of members 13. A member 13 typically inclines outwardly and downwardly from its inner edge 42 and then upwardly and into inlet compartment 11 toward its outer edge 40. The curvature of member 13 should be gentle, that is to say, there should be no sharp corners and no pockets or protuberances to interfere with the body movement of gas entry portions 61 of bed 18. The perforations of wall 60 are to be considered as being formed between respective inner edges 42 of adjacent members 13. The members 13 are mounted in a manner such that they cooperate to support gas entry portions 61, viz., the angle of a line drawn through edge 40 of a given member 13 at an angle of about 25° from the horizontal and upwardly toward the next superjacent member 13 should intersect the superjacent member, so that gas entry surface 39 borne by the given member 13 will display an inner edge 141 in contact with the superjacent member. It will be seen that the gas entry portions 61 are transversely disposed, upwardly spaced, and separated by the interposed supporting members 13, the gas entry faces 39 being substantially contiguous with outer edges 40. A line drawn through inner edge 141 of a given gas entry face 39 and the inner edge 42 of its supporting member 13 should be inclined at an angle less than about 45° from the horizontal, if inner support member edge 42 is below inner gas entry surface edge 141, as is the case in FIG. 1. Alternatively, edge 42 may lie above edge 141 (see the alternative design 213 for support members of wall 60 illustrated in FIG. 5).

Gas exit portions of bed 18 are seen at 62 in FIG. 1, and are spaced from edges 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

Figure 3:
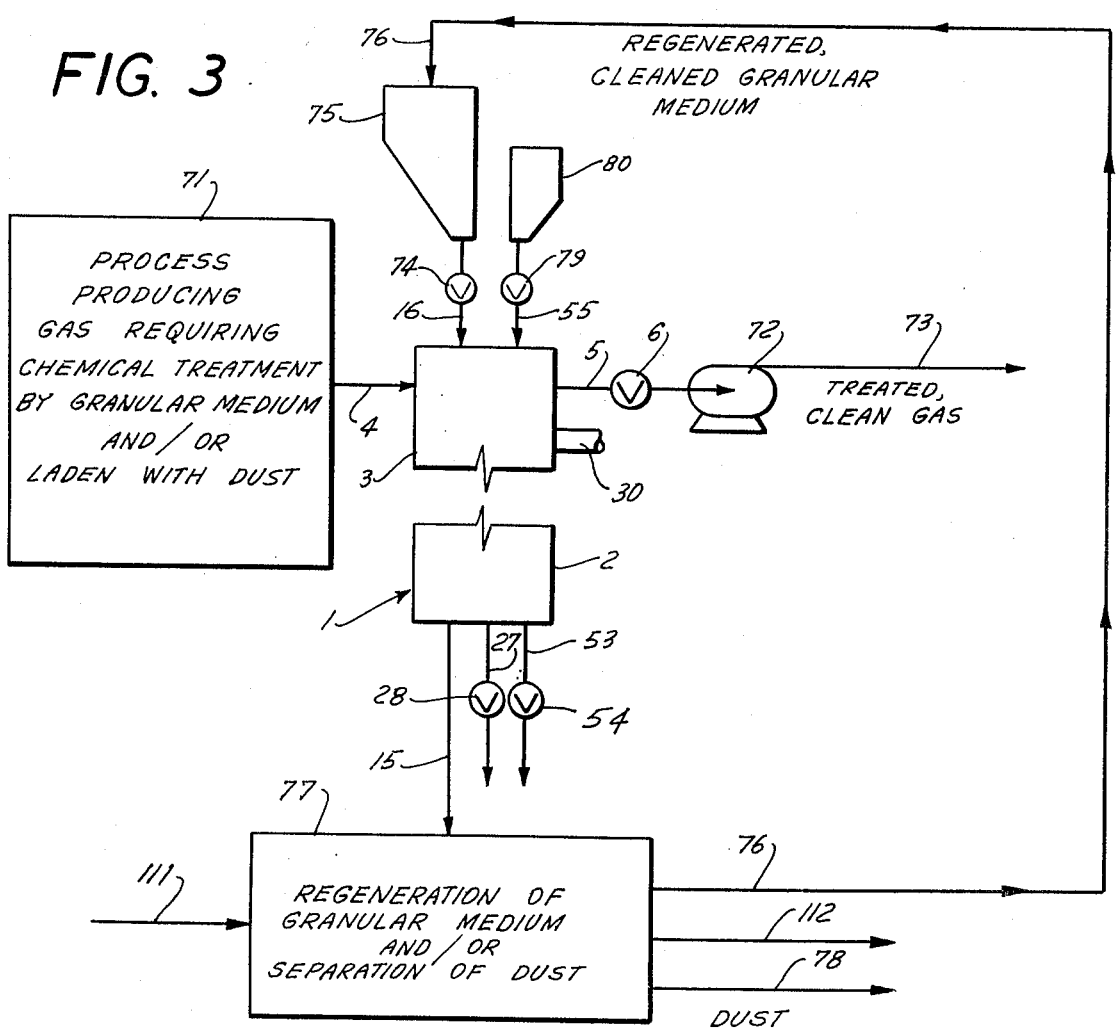
FIG. 3 is a schematic diagram illustrating use of the invention to produce chemical treatment of a gas by a granular medium, including a gas laden with dust.

In operation of panel bed contactor 1, the panel bed 1 is initially charged with granular contact solid from line 16, filling spaces 19, 18, and 17 as shown in FIG. 1. A second, coarser granular material is charged to spaces 50, 49, and 48 from line 55. Panel bed 1 may be connected, for example, to a process 71 producing a gas requiring chemical treatment by a granular medium, as shown in FIG. 3, and the panel bed contactor 1 of the instant invention affords the advantage that the gas to be treated chemically may also be dusty, whereupon panel bed contactor 1 acts both to treat the gas and to rid it of dust. The gas is caused to flow forwardly through panel bed 1 by opening valve 6 in pipe 5. If process 71 does not produce gas at sufficient pressure to cause the gas to flow readily through panel bed 1, optional blower 72 is conveniently provided to carry gas from pipe 5 to line 73 for conducting treated gas from the system. Periodically, tank 32 is filled with gas at pressure from supply 36, valve 35 is closed, valve 6 is closed to interrupt the flow of gas being treated and valve 31 is opened quickly to produce the specified transient reverse flow from compartment 23 to compartment 11. Pipe 15 is provided to withdraw solid removed from bed 18 by the puffback cleaning. The frequency of puffback cleaning is preferably regulated so that the withdrawn solid is essentially "used up" by the chemical treatment of the gas, i.e., lacking any further virtue for chemically treating the gas, i.e., spent. Such regulation is also best regulated so that solid in bed 18 between edges 42 and perforate wall 63 does not participate in the chemical treatment, i.e., the locus of treatment should remain entirely within gas entry portions 61 of the bed 18, lying between edges 40 and 141 and the vertical plane defined by edges 42. As seen in FIG. 3, pipe 15 sometimes advantageously conducts the spilled solids to means 77 for "regenerating" the spent solid, i.e., restoring its virtue for the intended chemical treatment of the gas, as may often be accomplished by contacting the spent solid with a fluid from line 111 with the generation of a discharge fluid removed from step 77 via line 112. Step 77 also conveniently includes separation of dust for removal via line 78, if any dust has been filtered from the gas undergoing chemical treatment. Pipe 76 is conveniently provided for return of regenerated contact solid to supply hopper 75, from which the solid may be returned to panel bed 1 via valve 74 and pipe 16. Alternatively, if regeneration of the spent solid is not desired, it may be discarded, and fresh granular contact solid may be supplied to hopper 75. Supply hopper 80 may conveniently be provided to hold the aforementioned second coarser granular material in readiness for supply to spaces 48, 49, and 50 via vialve 79 and pipe 55. After passage of the specified transient reverse flow and after waiting a few seconds for falling solid matter to settle to the bottom of compartment 11, valve 31 is closed, and valve 6 is opened to resume treatment of the gas by the freshly cleaned bed 18.

Transducers 37 and 38 are conveniently provided in a test to determine the aforementioned first and second critical minimum pressure differences between space 23 and space 11, although competent fluid dynamicists will be able to calculate instantaneous pressure difference versus time in a test of puffback, given the porosity of beds 18 and 49, the size of valve 31, the speed of its opening, the size of tank 32, the pressure therein, the length and the diameter of line 30, and the dimensions of compartment 23.

Tests for determining the critical pressure differences and illustrating the suitable limits on the time interval during which the puffback maintains the reverse pressure difference greater than the first critical minimum difference are discussed more fully in my aforementioned co-pending application number 1, together with representative data, and this discussion is incorporated herein by reference. In brief, a time interval of about 150 milliseconds represents an approximate upper limit for acceptable performance, and I prefer a time interval below 100 milliseconds and preferably below 50 milliseconds for use of the panel bed 1 as a filter. At a time much longer than 150 milliseconds, the granular material movement took on much more of the character of the localized spill and less of the preferred body movement, and the distribution of the spill from gas entry surfaces 39 became poor, there being a much larger spill from the top surfaces than from the bottom. A practical minimum time interval for operation of the arrangement of FIG. 1 appears to be about 3 to 5 milliseconds, given the practical requirement that space 23 must be large enough to accommodate a flow of gas leaving wall 64. It should be noted, however, that one might, for example, achieve an extremely short time interval by mounting a large number of blank cartridges on wall 2 and firing them simultaneously to discharge gas explosively into space 23.

Figure 4:
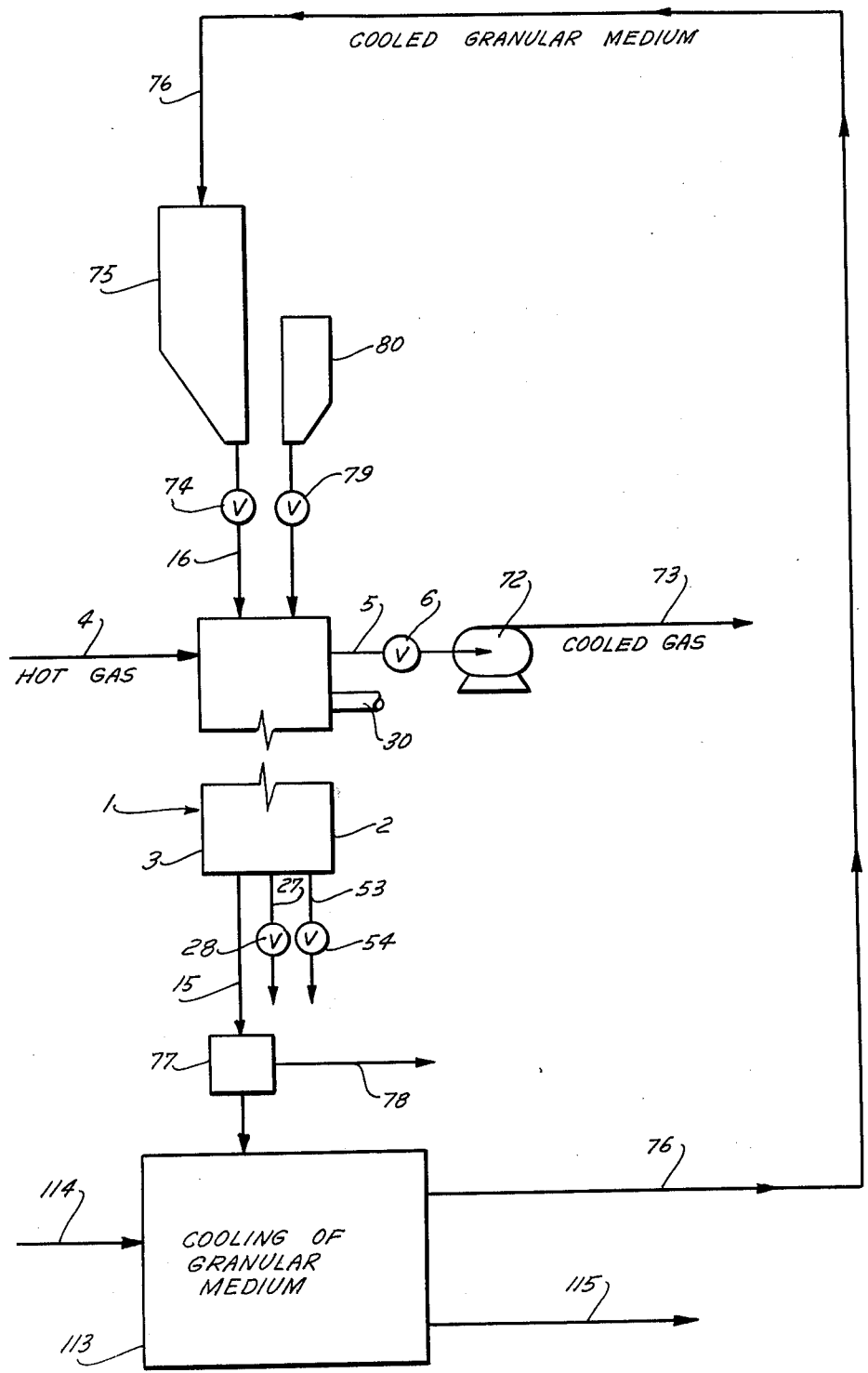
FIG. 4 is a schematic diagram illustrating use of the invention to cool a hot gas by heat exchange against a cold granular medium.

FIG. 4 illustrates how panel bed 1 may be used to cool a hot gas by countercurrent contact with a cold granular solid medium, with the advantage that the hot gas may be dusty, in which case, dust is removed from the system via line 78, as before in FIG. 3. The cooled granular medium from pipe 15 may advantageously give up its heat to an operation requiring heat, as at 113, for example, by heating a cold fluid supplied to 113 from line 114 to provide a hot fluid via line 115.

The panel bed contactor of the instant invention affords countercurrent gas-solid contacting equipment of outstandingly small size and at outstandingly small gas pressure loss (typically below 20 centimeters of water). Gas velocities in the horizontal direction across bed 18 in excess of 30 feet per minute are preferred, and overall gas-treating capacities of more than 600 cubic feet per minute per square foot of ground area occupied by the panel bed device are readily provided. The panel bed contactor also has the advantage of being capable of treating a gas with a contact solid of outstandingly small size. Gravitating beds of the type ordinarily used in the art for countercurrent gas-solid contacting commonly use particles larger than ⅛ inch in size and often use particles larger than 1 inch. I prefer to use a granular contact solid smaller than about 10 mesh (U.S. Standard), and frequently it is advantageous to use a solid smaller than about 20 mesh or a solid smaller than about 40 mesh. Generally speaking, I prefer a contact solid larger than about 100 mesh. The smaller contact solid sizes have the advantage that there is less loss of solid because of the production of fines due to attrition when such smaller solids are handled and moved about in conventional systems for conveying solids pneumatically.

FIGS. 5 through 9 illustrate alternative designs 213, 313, 413, 513, and 613 for the support members of perforate wall 60, and these designs illustrate the range and flexibility of my specified new support member design to meet various gas-solid treating requirements. In these figures, louvers 46 of wall 63 are sometimes inclined at an angle and are sometimes horizontal. I find that satisfactory results are obtained whatever the orientation of louvers 46, but generally I prefer that louvers 46 be inclined approximately at an angle to conform to the approximate angle at which the body movement of bed 18 causes contact solid to enter gas inlet portions 61 of bed 18 past the plane defined by edges 42.

Figure 6:
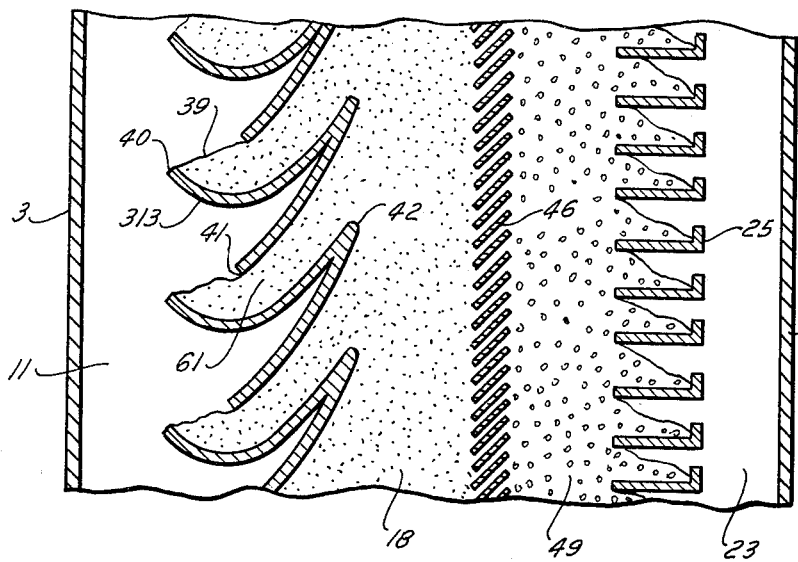
Figure 7:
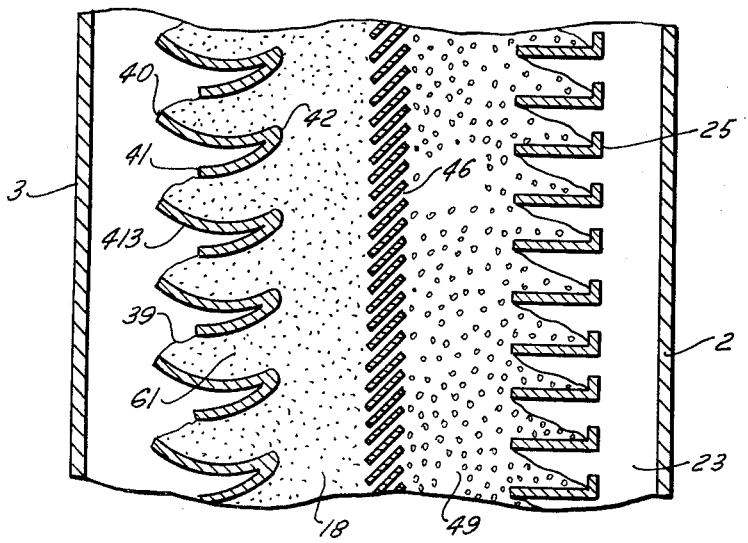
Figure 9:
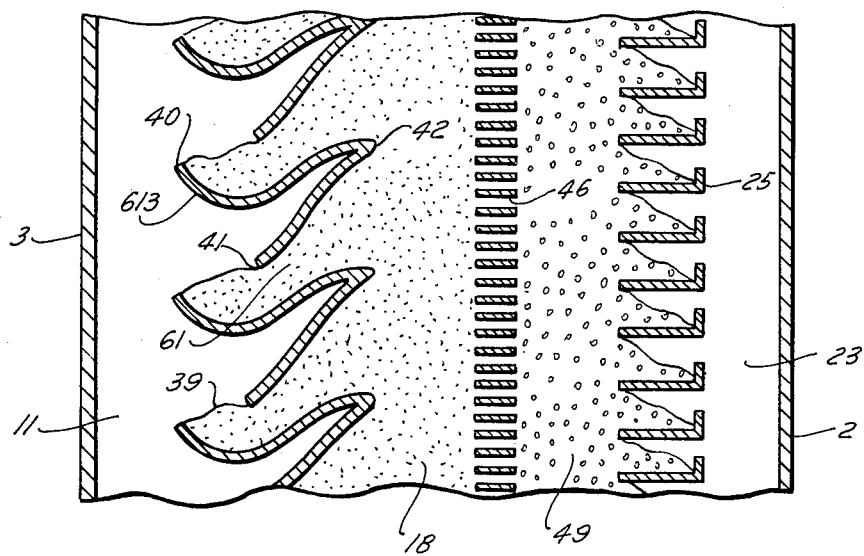

Support members 313, 413, and 613 of FIGS. 6, 7, and 9 respectively are of a design in which a typical support member has an upper and a lower surface articulated at an edge joint at their inner edges 42. The outer edge of a typical gas entry face 39 is substantially contiguous with the outer edge 40 of the upper surface of the typical member supporting the gas entry face. The inner edge of the typical gas entry face 39 is substantially contiguous with the outer edge 41 of the lower surface of the superjacent member. A design of this general type is to be preferred for a panel bed contactor that may be subject to fairly rapid fluctuations in operating temperature, for the space between upper and lower surfaces of the typical support member provides room for expansion and contraction with changes of dimension of the panel bed.

Figure 10:
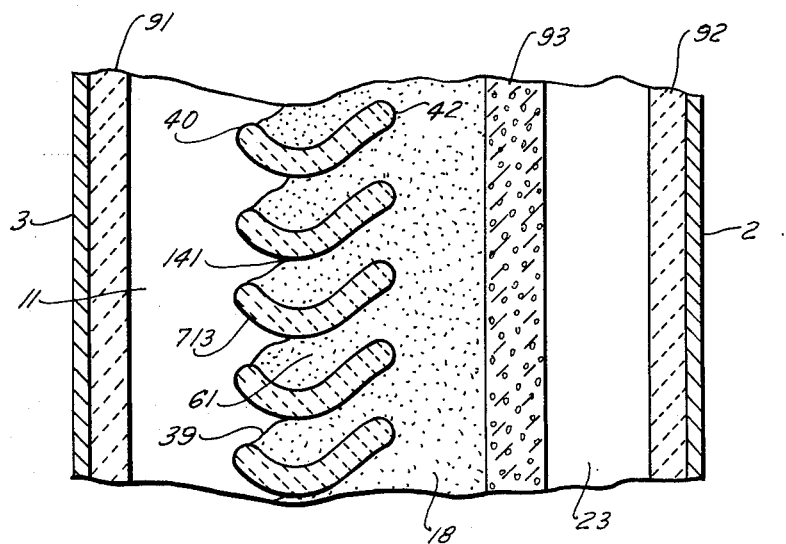
FIG. 10 shows an alternate design of support members suitable for construction in ceramic and for operation at extremely high temperature.

FIG. 10 illustrates a panel bed design suitable for use at an extremely high temperature. Outer walls 3 and 2 are provided with insulation 91 and 92 respectively. Support member 713 of perforate wall 60 is made of ceramic, and perforate wall 93, cooperating with wall 60 to retain bed 18, is made of porous ceramic.

FIGS. 11A and 11B, for convenient reference, show the steady localized spill of sand produced at support members of the two types disclosed herein by a steady reverse flow of gas across bed 18. Sand spills from a narrow zone immediately adjacent to inner edge 141 of member 213's free surface 39, and the spill originates along the underneath side of the support member. Sand spills from a narrow zone immediately adjacent to edge 41 of member 313, and the spill originates along the underneath side of the lower surface of the support member.

FIGS. 12C and 12D depict the transient localized spill that results from a transient reverse flow of gas of intensity sufficient to produce a pressure difference surpassing the first critical minimum but not attaining the second, as shown in FIGS. 12A and 12B, where curves 83 and 86 give the instantaneous pressure difference ($\Delta P$), where line 81 is the first critical minimum $\Delta P$, and where line 82 is the second critical minimum $\Delta P$ observed for the rate of rise of curve 83 toward line 82, and where line 85 is the second critical minimum $\Delta P$ observed for the rate of rise of curve 86 to line 85.

Body movement produced by the specified puffback is illustrated in FIGS. 13B and 13C, viz., a puffback in which the reverse transient flow of gas produces a pressure difference curve 88 in FIG. 13A, which peaks at $\Delta P$ 90 that is well beyond the second critical minimum $\Delta P$ 82. Time interval 89 is below about 150 milliseconds, and preferably below about 50 milliseconds.

For a pressure difference curve like curve 91 in FIG. 14A, where time interval 92 was several hundred milliseconds, I observed a persistent, prolonged afterspill of sand from edges 40 as depicted in FIGS. 14B and 14C. Such an afterspill produces a useless loss of contact solid from bed 18, and causes performance of the bed as a filter, if such be desired, to deteriorate. If in a given situation, a larger spill of solid is desired than can conveniently be provided by a single application of the specified puffback cleaning technique, repeated application of puffback cleaning is preferably to unlimited extension of time interval 92, as seen in FIG. 14A.

FIG. 15 shows how a bellows 101 can deliver a suitable reverse transient flow of gas to panel bed 1 via pipe 30. FIG. 16 shows how such a suitable flow can be delivered by attaching to pipe 30 a chamber 102 in which is mounted a blank cartridge 103 that may be fired by striking it with hammer 104.

FIG. 17 shows an alternative arrangement that may be preferred if the panel bed is used to treat gas at elevated pressure. Tank 132 is connected to line 4 via pipe 130 and quick-opening valve 131. The pressure of gas in tank 132 is reduced by connecting the tank to a receiver of gas at low pressure 136 via pipe 135 and valve 134. Pressure gauge 133 is provided to assist in adjusting the pressure in tank 132. Valve 134 is then closed, valve 137 in line 4 is closed, stopping the flow of gas to be treated in panel bed 1, and valve 131 is opened quickly to produce a transient flow of gas from line 5 to line 4 and thence into tank 132. Valve 131 is then closed, valve 137 opened, and a new treating cycle can begin.

In operation of panel bed 1, it is preferable that valve 6 be opened slowly at the start of each gas-treating cycle, so that a sudden rush of gas into the bed 18 via surfaces 39 does not compact the bed and cause gaps to appear beneath the surfaces of members 13 inboard from edge 141.

The chemical nature of the contact solid is dictated by the treating process to be carried out in panel bed 1. The instant invention may be advantageously used for a variety of applications, a few examples sufficing to illustrate the possibilities.

A prime application is for removing sulfur oxides and fly ash from stack gases from the combustion of pulverized coal. Suitable contact solids for this application are known including as active ingredients copper oxide, manganese oxide, alkalized alumina, calcium oxide, calcium carbonate, activated carbon suitable for adsorbing sulfur dioxide, and other substances.

Another prime application is for removing hydrogen sulfide and other sulfur species from fuel gas produced by gasifying coal or heavy fuel oil together with carbon fines or soot present in the raw gas from a typical gasification step. Suitable contact solids might contain iron oxide, calcium oxide, calcium carbonate, and other substances.

Yet another prime application is for drying gases by adsorption of moisture upon silica gel, alumina, or molecular sieves, and for adsorption of acid gases from natural gas or synthetic fuel gas by molecular sieves.

The invention may advantageously be used to hold catalyst for a chemical step which gradually destroys the solid's catalytic powers.

The high-temperature ceramic panel of FIG. 10, or a panel constructed of a suitably temperature resistant metal, may advantageously serve to contact high-temperature offgases from a coal- or oil-gasification step both to remove dust, that would form a filter cake or surfaces 39 that would further react with unreacted steam or carbon dioxide present in the offgases, as well as to contact the gases with additional carbon in the form of granular coke.

It should be noted that the porosity of granular material bed 18 should be brought initially to the uniform porosity appropriate for the puffback intensity selected for operation, as discussed more fully in my aforementioned co-pending application number 1, "Treating Gas and Granular Material in Panel Bed". Specifically, it is advantageous to subject the panel bed initially to a "strong" puffback at an intensity exceeding that contemplated for Subsequent operations, or to discharge a controlled quantity of granular material from the bottom of the panel bed.

I have obtained satisfactory results in experiments on support members like 313 in FIG. 6 where the least radius of curvature of either of the two surfaces comprising element 213 occurred at the lower point of the upper surface, extending from edge 40 to edge 42, and was about 7/32 inch. The horizontal width of the element, from edge 40 to edge 42, was about 0.675 inches. The experiments used 20–30 mesh sand. Accordingly, the largest particle in the sand was about one-seventh the minimum radius of curvature of the support member. I believe that in practice the curvature of the surfaces of suitable support members for wall 60 should be sufficiently gentle so that the radius of curvature nowhere is less than about five times the dimension of the largest particle present in the gas-treating solid medium.

I do not wish my invention to be limited to the particular embodiments illustrated in the drawings and described above in detail. Other arrangements will be recognized by study of my aforementioned co-pending applications and by those skilled in the art, as well as purposes other than those discussed herein which the invention can advantageously serve.

It will be recognized that each and every support member 13 of panel bed 1 need not conform to the design specified herein for a typical member. Top and bottom members, especially, may sometimes advantageously be atypical.

Figure 8:
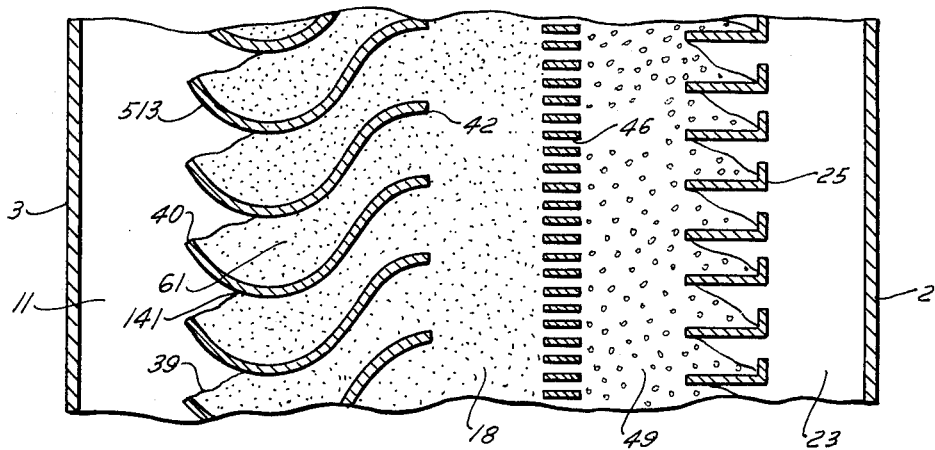

It will also be understood that when granular material is first charged to bed 18, it may sometimes be necessary to apply several puffbacks to advance gas entry surfaces to positions 39 contiguous with outer edges 40 (for example, see FIG. 8).

I claim:

1. A method of countercurrently contacting gas and granular material with each other to effect physical or chemical treatment comprising:

a. arranging granular material in a bed having a plurality of transversely disposed upwardly spaced gas entry portions separated by interposed supporting members having outer and inner edges with respect to the bed wherein said gas entry portions have gas entry faces with outer edges substantially contiguous with said outer edges of said supporting members and wherein a supporting member is gently curved and inclines downwardly and inwardly from its outer edge and then upwardly and inwardly toward its inner edge and wherein the inner edge of a typical supporting member is above the inner edge of the superjacent free surface of granular material and wherein said bed has gas exit portions spaced from said inner edges of said supporting members;

b. forwardly flowing gas in a substantially continuing flow from the gas entry portions into and through the granular material bed and outwardly from the gas exit portions to effect said treatment; and c. thereafter causing a transient flow of an auxiliary gas to move in the direction in reverse to the flow of said gas in (b);

d. said transient reverse flow producing first a rise at a given rate of rise and subsequently a fall in the pressure difference between said gas exit portions and said gas entry portions, said difference produced by said transient reverse flow remaining greater than a first critical minimum difference for a time interval of less than about 150 milliseconds, said first critical difference being that difference at which a steady flow of gas in said reverse direction just proudces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed.

2. The method of claim 1 in which said time interval is less than about 50 milliseconds.

3. The method of claim 1 in which a supporting member has an upper and a lower surface each having outer and inner edges with respect to the filter bed wherein said surfaces are articulated at an edge joint at their respective inner edges and wherein the outer edge of a gas entry face is substantially contiguous with the outer edge of the upper surface of the member supporting said face and wherein the inner edge of the gas entry face is substantially contiguous with the outer edge of the lower surface of the superjacent supporting member.

4. The method of claim 3 in which said time interval is less than about 50 milliseconds.

5. A method of countercurrently contacting a gas and a granular material with each other to effect physical or chemical treatment, comprising:

a. arranging granular material in a bed having a plurality of transversely disposed upwardly spaced gas entry portions separated by interposed supporting members having outer and inner edges with respect to the bed wherein said gas entry portions have gas entry faces with outer edges substantially contiguous with said outer edges of said supporting members and wherein a supporting member is gently curved and inclines downwardly and inwardly from its outer edge and then upwardly and inwardly toward its inner edge and wherein the inner edge of a supporting member is below the inner edge of the superjacent free surface of granular material so that a line drawn through these edges is inclined at an angle of less than about 45° to the horizontal and wherein said bed has gas exit portions spaced from said inner edges of said supporting members;

b. forwardly flowing gas in a substantially continuing flow from the gas entry portions into and through the granular material bed and outwardly from the gas exit portions to effect said treatment; and c. thereafter causing a transient flow of an auxiliary gas to move in the direction in reverse to the flow of said gas in (b);

d. said transient reverse flow producing first a rise at a given rate of rise and subsequently a fall in the pressure difference between said gas exit portions and said gas entry portions, said difference produced by said transient reverse flow remaining greater than a first critical minimum difference for a time interval of less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed.

6. A gas-solid contactor comprising:

a pair of upwardly extending horizontally spaced-apart perforate retaining walls;

a gas inlet compartment adjacent and in flow communication with the perforations of the first of the perforate walls;

a gas outlet compartment in flow communication with the perforations of the second of the perforate walls;

closure means about the space between the first and second perforate walls closing said space against the passage of gas except through the perforations of said perforate walls;

feed means for supplying a loose solid particulate material into the space between the perforate walls;

a plurality of support members each adjacent a perforation of said first perforate wall, a support member being arranged to extend outwardly and downwardly in a gentle curve from below its adjacent perforation and then to extend further in a gentle curve upwardly and into the inlet compartment, to support and expose to the inlet compartment a plurality of free surfaces of particulate material, said support members being arranged cooperatively to support the particulate material and retain the material within said space, and where the inner edge of a support member is above the inner edge of the free surface supported by the member;

an inlet for admitting a gas into the inlet compartment for passage into the free surfaces and through the particulate material to the outlet compartment;

an outlet for discharging gas from the outlet compartment;

means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including:

a. means for moderating the rate of said rise in said pressure difference;

b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and, c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and, means for discharging from the inlet compartment material which is spilled thereinto by the body-movement means.

7. The gas-solid contactor of claim 6 in which said time interval is less than about 50 milliseconds.

8. The gas-solid contactor of claim 6 in which said body-movement means comprise: a source of gas under pressure and means for effecting a sudden discharge of gas from the pressure source into said outlet compartment and volume control means for limiting the quantity of gas discharged into said outlet compartment.

9. The gas-solid contactor of claim 6 in which said body-movement means comprise: a tank held at a lower pressure, means for effecting a sudden discharge of gas from said inlet compartment into said tank, and volume control means for limiting the quantity of gas discharged from said inlet compartment into said tank.

10. The gas-solid contactor of claim 6 in which said body-movement means include a chamber connected by pipe means to said outlet compartment, a blank cartridge mounted to discharge gas explosively into said chamber, and means for firing said blank cartridge.

11. The gas-solid contactor of claim 6 in which said body-movement means comprises a bellows fitted to discharge gas into said outlet compartment.

12. A gas-solid contactor comprising:

a pair of upwardly extending horizontally spaced-apart perforate retaining walls;

a gas inlet compartment adjacent and in flow communication with the perforations of the first of the perforate walls;

a gas outlet compartment in flow communication with the perforations of the second of the perforate walls;

closure means about the space between the first and second perforate walls closing said space against the passage of gas except through the perforations of said perforated walls;

feed means for supplying a loose solid particulate material into the space between the perforate walls;

a plurality of support members each adjacent a perforation of said first perforate wall, a said support member having two surfaces articulated at an edge joint substantially adjacent and below the member's respective perforation and the lower of the two surfaces being arranged to extend outwardly and downwardly in a gentle curve from said edge joint and into the inlet compartment and the upper of the two surfaces being arranged to extend outwardly and downwardly in a gentle curve from said edge joint and then to extend further in a gentle curve upwardly and into the inlet compartment, to support and expose to the inlet compartment a plurality of free surfaces of the particulate material, said support members being arranged cooperatively to support the particulate material and retain the material within said space, and where the outer edge of a lower surface of a support member is below the edge joint of the subjacent support member;

an inlet for admitting a gas into the inlet compartment for passage into the free surfaces and through the particulate material to the outlet compartment, an outlet for discharging gas from the outlet compartment;

means for periodically effecting a body movement toward the inlet compartment of at least those portions of the particulate material including said free surfaces and which are retained on said support members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including:

a. means for moderating the rate of said rise in said pressure difference;

b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and, c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and, means for discharging from the inlet compartment material which is spilled thereinto by the body-movement means.

13. The gas-solid contactor of claim 12 in which said time interval is less than about 50 milliseconds.

14. The gas-solid contactor of claimd 12 in which said body-movement means comprise: a source of gas under pressure and means for effecting a sudden discharge of gas from the pressure source into said outlet compartment and volume control means for limiting the quantity of gas discharged into said outlet compartment.

15. The gas-solid contactor of claim 12 in which said body-movement means comprise: a tank held at a lower pressure, means for effecting a sudden discharge of gas from said inlet compartment into said tank, and volume control means for limiting the quantity of gas discharged from said inlet compartment into said tank.

16. The gas-solid contactor of claim 12 in which said body-movement means include a chamber connected by pipe means to said outlet compartment, a blank cartridge mounted to discharge gas explosively into said chamber, and means for firing said blank cartridge.

17. The gas-solid contactor of claim 12 in which said body-movement means comprise a bellows fitted to discharge gas into said outlet compartment.

18. A gas-solid contactor comprising:
a pair of upwardly extending horizontally spaced-apart perforated retaining walls;
a gas inlet compartment adjacent and in flow communication with the perforations of the first of the perforate walls;
a gas outlet compartment in flow communication with the perforations of the second of the perforate walls;
closure means about the space between the first and second perforate walls closing said space against the passage of gas except through the perforations of said perforate walls;
feed means for supplying a loose solid particulate material into the space between the perforate walls;
a plurality of support members each adjacent a perforation of said first perforate wall, a support member being arranged to extend outwardly and downwardly in a gentle curve from below its adjacent perforation and then to extend further in a gentle curve upwardly and into the inlet compartment, to support and expose to the inlet compartment a plurality of free surfaces of particulate material, said support members being arranged cooperatively to support the particulate material and retain the material within said space, and where the inner edge of a support member is below the inner edge of the free surface supported by the member so that a line drawn through these edges is inclined at an angle of less than about 45° to the horizontal;

an inlet for admitting a gas into the inlet compartment for passage into the free surfaces and through the particulate material to the outlet compartment;
an outlet for discharging gas from the outlet compartment;
means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said means for effecting said transient flow including;
a. means for moderating the rate of said rise in said pressure difference;
b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and,
c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material towards said free surfaces to spill a portion of the granular material from said free surfaces; and, means for discharging from the inlet compartment material which is spilled thereinto by the body-movement means.

19. A gas-solid contractor comprising:
a pair of upwardly extending horizontally spaced-apart perforate retaining walls;
a gas inlet compartment adjacent and in flow communication with the perforations of the first of the perforate walls;
a gas outlet compartment in flow communication with the perforations of the second of the perforate walls;
closure means about the space between the first and second perforate walls closing said space against the passage of gas except through the perforations of said perforated walls;
a plurality of support members each adjacent a perforation of said first perforate wall, a said support member having two surfaces articulated at an edge joint substantially adjacent and below the member's respective perforation and the lower of the two surfaces being arranged to extend outwardly and downwardly in a gentle curve from said edge joint and into the inlet compartment and the upper of the two surfaces being arranged to extend outwardly and downwardly in a gentle curve from said edge joint and then to extend further in a gentle curve upwardly and into the inlet compartment, to support and expose to the inlet compartment a plurality of free surfaces of the particulate material, said support members being arranged cooperatively to support the particulate material and retain the material within said space, and where the outer edge of a lower surface of a support member is above the edge joint of the subjacent support member so that a line drawn through said outer edge and said edge joint forms an angle less than about 45° to the horizontal;

an inlet for admitting a gas into the inlet compartment for passage into the free surfaces and through the particulate material to the outlet compartment;

an outlet for discharging gas from the outlet compartment;

means for periodically effecting a body movement towards the inlet compartment of at least those portions of the particulate material including said free surfaces and which are retained on said support members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including:

a. means for moderating the rate of said rise in said pressure difference;

b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and, c. means for moderating said transient flow so that said pressure difference produced by said transient flow peaks to a top value beyond a second critical minimum difference, which is the pressure difference at which a transient flow of gas from said outlet compartment to said pressure difference at said rate of rise just initiates a body movement of the granular material toward said free surfaces to spill a portion of the granular material from said free surfaces; and, means for discharging from the inlet compartment material which is spilled thereinto by the body-movement means.

20. A gas-solid contactor comprising:

a pair of upwardly extending horizontally spaced-apart perforate retaining walls;

a gas inlet compartment adjacent and in flow communication with the perforations of the first of the perforate walls;

a gas outlet compartment in flow communication with the perforations of the second of the perforate walls;

closure means about the space between the first and second perforate walls closing said space against the passage of gas except through the perforations of said perforate walls;

feed means for supplying a loose solid particulate material into the space between the perforate walls;

a plurality of support members each adjacent a perforation of said first perforate wall, a support member being arranged to extend outwardly and downwardly in a gentle curve from below its adjacent perforation and then to extend further in a gentle curve upwardly and into the inlet compartment, to support and expose to the inlet compartment a plurality of free surfaces of particulate material, said support members being arranged cooperatively to support the particulate material and retain the material within said space, and where the inner edge of a support member is below the inner edge of the free surface supported by the member so that a line drawn through these edges in inclined at an angle of less than about 45° to the horizontal;

an inlet for admitting a gas into the inlet compartment for passage into the free surfaces and through the particulate material to the outlet compartment;

an outlet for discharging gas from the outlet compartment;

means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including:

a. means for moderating the rate of said rise in said pressure difference;

b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and, c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and, means for discharging from the inlet compartment material which is spilled thereinto by the body-movement means.

21. A gas-solid contactor comprising:

a pair of upwardly extending horizontally spaced-apart perforate retaining walls;

a gas inlet compartment adjacent and in flow communication with the perforations of the first of the perforate walls;

a gas outlet compartment in flow communication with the perforations of the second of the perforate walls;

closure means about the space between the first and second perforate walls closing said space against the passage of gas except through the perforations of said perforate walls;

feed means for supplying a loose solid particulate material into the space between the perforate walls;

a plurality of support members each adjacent a perforation of said first perforate wall, a said support member having two surfaces articulated at an edge joint substantially adjacent and below the member's respective perforation and the lower of the two surfaces being arranged to extend outwardly and downwardly in a gentle curve from said edge joint and into the inlet compartment and the upper of the two surfaces being arranged to extend outwardly and downwardly in a gentle curve from said edge joint and then to extend further in a gentle curve upwardly and into the inlet compartment, to support and expose to the inlet compartment a plurality of free surfaces of the particulate material, said support members being arranged cooperatively to support the particulate material and retain the material within said space, and where the outer edge of a lower surface of a support member is above the edge joint of the subjacent support member so that a line drawn through said outer edge and said edge joint forms an angle less than about 45° to the horizontal;

an inlet for admitting a gas into the inlet compartment for passage into the free surfaces and through the particulate material to the outlet compartment;

an outlet for discharging gas from the outlet compartment;

means for periodically effecting a body movement toward the inlet compartment of at least those portions of the particulate material including said free surfaces and which are retained on said support members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including:

a. means for moderating the rate of said rise in said pressure difference;

b. means for moderating said transient flow so that said pressure difference remains greater than a first critical minimum difference for a time interval of less than about 150 milliseconds, said first critical difference being that difference at which a steady flow of gas from said outlet compartment to said inlet compartment just produces a localized spill of granular material from said free surfaces into said inlet compartment; and, c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and, means for discharging from the inlet compartment material which is spilled thereinto by the body-movement means.

\* \* \* \* \*